United States Patent [19]

Shahid

[11] Patent Number: 5,943,461
[45] Date of Patent: Aug. 24, 1999

[54] CONNECTORIZED OPTICAL MODULE PACKAGE AND METHOD USING SAME WITH INTERNAL FIBER CONNECTIONS

[75] Inventor: Muhammed Afzal Shahid, Ewing Township, Mercer County, N.J.

[73] Assignee: Lucent Technologies Inc, Murray Hill, N.J.

[21] Appl. No.: 08/854,853

[22] Filed: May 12, 1997

[51] Int. Cl.$^6$ .................................................. G02B 6/36
[52] U.S. Cl. ............................... 385/92; 285/88; 285/89; 285/24; 285/76; 285/77
[58] Field of Search ............................. 385/15, 24, 76, 385/77, 88, 89, 92

[56] References Cited

U.S. PATENT DOCUMENTS

| | | | |
|---|---|---|---|
| 4,844,573 | 7/1989 | Gillham et al. | 385/89 X |
| 4,861,134 | 8/1989 | Alameel et al. | 385/89 X |
| 5,214,444 | 5/1993 | Kerr et al. | 385/92 X |
| 5,315,681 | 5/1994 | Smith et al. | 385/89 |
| 5,572,615 | 11/1996 | Emori | 385/92 |

OTHER PUBLICATIONS

Hitachi Opto Data Book, Part 2, OC–1 and OC–3 Transceivers, pp. 394–401, Hitachi America Ltd., Brisbane, CA, 1992.

Mitsubishi Optoelectronics Databook, Optical Semiconductor Devices and Optical–Fiber Communication Systems, pp. 7–108 through 7–111, 1992.

Northern Telecom, Optoelectronics Databook, Advanced Products, p. 29. (No date of publication).

*Primary Examiner*—Brian Healy

[57] ABSTRACT

An optical module is packaged using one or more internal fiber connections which are arranged to minimize the likelihood of internal connection damage when the module is installed on a circuit board. The module includes at least one external connector arranged on a side of the package, and a submount within the package for supporting a component such as an optical source or an optical detector. An optical fiber is connected within the package from the submount to a connector interface of the external connector. The end of the fiber at the connector interface has a preformed connector thereon which engages a ferrule associated with the interface. The other end of the fiber is attached to the submount for optimal coupling efficiency. The fiber may undergo a bend of about 90° or 180° from its first end to its second end. In order to accommodate the fiber bend, the component submount is positioned within the package in a location remote from the external connector. The module package is particularly well-suited for use with optical transmitters, receivers and transceivers, but is also suitable for use with passive optical devices.

40 Claims, 3 Drawing Sheets

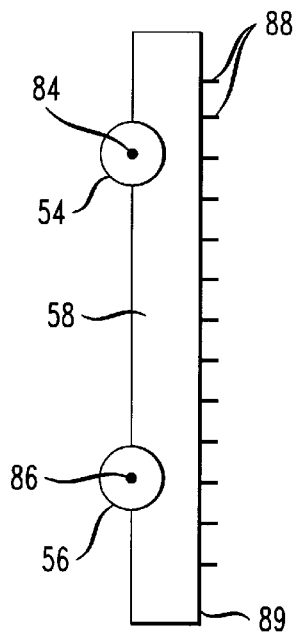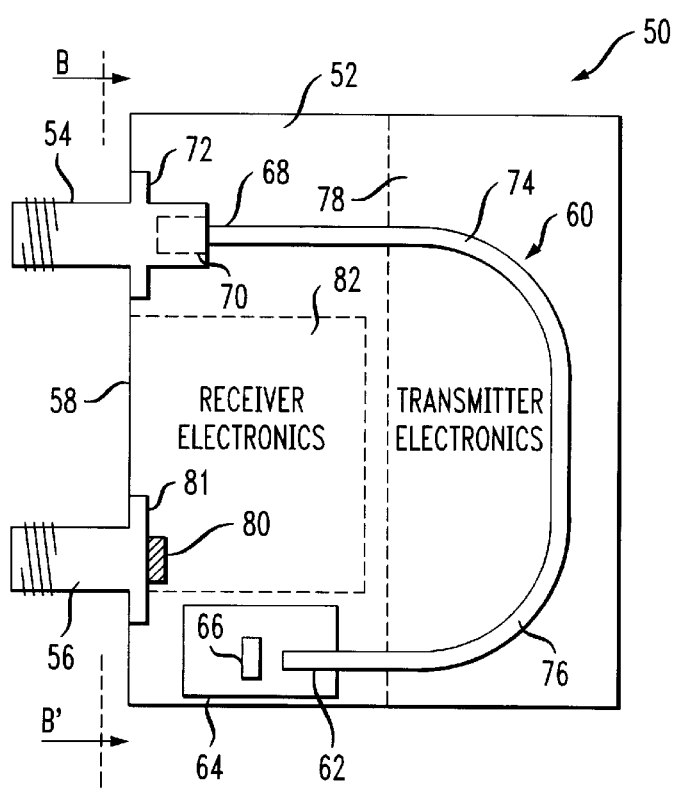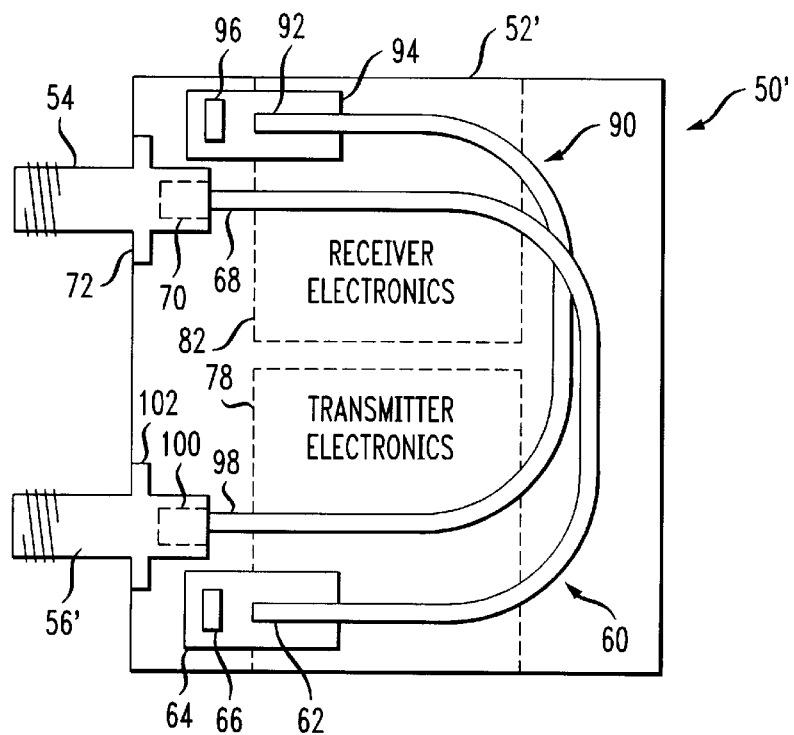

5,943,461

CONNECTORIZED OPTICAL MODULE PACKAGE AND METHOD USING SAME WITH INTERNAL FIBER CONNECTIONS

FIELD OF THE INVENTION

The present invention relates generally to optical module packaging and more particularly to opto-electronic module packages and other optical module packages which utilize internal fiber connections and input or output connections to external optical fibers on a circuit board.

BACKGROUND OF THE INVENTION

A significant problem which arises in the manufacturing of opto-electronic modules such as receivers, transmitters and transceivers relates to the assembly of the modules onto circuit boards. The problem is attributable to the fact that many high-speed opto-electronic modules utilize direct attachment of a single-mode or other type of optical fiber to internal components in order to maximize the amount of optical signal power coupled to or from the fiber within the module package. Modules in which internal optical fibers extend from the package for external connection with a circuit board are generally referred to as "pig-tailed" modules. The fibers extending outside the package are generally very fragile, and the module therefore cannot be installed on a circuit board using automated assembly processes. Instead, great care must be taken during the board-level installation process to avoid subjecting the fibers extending from the package to a tight bend or other stressful condition. A manual assembly process is often used to install the module onto the circuit board. After the module package is soldered, epoxied or otherwise secured in place on the board, an operator very carefully winds or secures the excess external fiber on spools or other structures which are also mounted on the board. This is not only a labor-intensive and time-consuming process, but is also a primary cause of fiber breaks which can render the module unusable.

Some prior art opto-electronic modules avoid the board-level fiber management problems associated with pig-tailed modules by utilizing a "connectorized" package in which optical fibers do not extend from the package. In fact, conventional connectorized packages generally do not utilize any internal fiber connections. This is due in part to the fact that the arrangement of a fiber adjacent to an internal interface of the connector may lead to undesirable reflection at the interface as well as other stability problems. Instead, conventional connectorized packages may be configured with an optical detector or optical signal source adjacent to the internal connector interface, such that light is coupled directly to or from the connector interface via lenses or other types of optics. However, the coupling efficiency of modules configured in this manner is generally inferior to that of the pig-tailed modules. Devices which require an optimal coupled optical power, and thus an internal fiber connection, are generally required to utilize a pig-tailed package instead of a connectorized package, and will thus be susceptible to the above-described fiber management problems at board-level assembly.

If the opto-electronic module is a transceiver, that is, a device incorporating both an optical transmitter and an optical receiver in a common package, it may require the fiber pig-tail connection only for the transmitter output. This is due to the fact that the active area of the positive-intrinsic-negative (PIN) diode detector or avalanche photodiode (APD) detector used in the receiver is typically very large, on the order of 75 $\mu$m in diameter. Therefore, the enhanced coupling provided by the fiber pig-tail connection may be unnecessary in the receiver. Although many opto-electronic modules include a multimode fiber, having a core diameter on the order of 50 to 100 $\mu$m, attached to the receiver detector, this fiber pig-tail connection is often not required. The most significant aspect of the internal fiber connection problem in a transceiver thus often relates to managing the single-mode fiber pig-tail connection to the laser or other transmitter optical source.

FIGS. 1 and 2 illustrate conventional opto-electronic transceiver module packages. FIG. 1 shows a connectorized optical transceiver module 10. The module 10 includes a package 12, an input or receive optical connector 14 and an output or transmit optical connector 16. The package 12 is illustrative of the type of package used in Part No. HFBR 5205T from Hitachi. The receive connector 14 is configured for attachment to a mating connector of an optical fiber on a circuit board, such that an input optical signal may be supplied to an optical receiver in the package housing 12. The receiver portion of the module 10 includes receiver electronics 18, a submount 20 and a PIN diode or APD detector 22 attached to the submount 20. The detector 22 converts the input optical signal into an electrical signal which is processed in receiver electronics 18. The transmit connector 16 is also configured for attachment to a mating connector of an optical fiber on a circuit board, such that an output optical signal generated by a transmitter in the package housing 12 may be supplied to the circuit board. The transmitter portion of the module 10 includes transmitter electronics 24, a submount 26 and an optical source 28 attached to the submount 26. The optical source 28 may be, for example, a Fabry-Perot laser or a laser diode. The optical source 28 generates an output optical signal which is modulated by a data stream or other electrical signal supplied to the optical source 28 from the transmitter electronics 24. The connectorized module 10 may be about 1 inch in width, 2 inches in length and ½ inch in thickness. As noted above, the conventional connectorized package of FIG. 1 is generally unable to utilize internal fiber connections. The connectorized package therefore does not provide optimal coupling of optical signal power in and out of the module 10, due to connector and mating losses, interface reflections and other instabilities.

FIG. 2 shows a typical pig-tailed transceiver module 30, with a package 32 illustrative of the type used in Part No. MF-156DS-TR124-002/003 from Mitsubishi Electric and Part No. TRV5366 from Hitachi. The module 30 includes a transmit output 36 supporting a pig-tailed transmit optical fiber 38, and a receive input 40 supporting a pig-tailed receive optical fiber 42. The transmit output and receive input are arranged on the same side of the package 32. The package 32 may be on the order of about 3 inches wide by 4 inches long by ½ inch thick. The fiber 42 is an input multi-mode fiber which supplies an input optical signal to a receiver in the module 30, and the fiber 38 is an output single-mode optical fiber which carries an output optical signal generated by a transmitter laser or other optical source in the module 30. As noted above, one or both of the single-mode optical fiber 38 and the input multi-mode fiber 42 may be configured using a direct fiber connection to an internal submount. The pig-tailed fiber is secured in a V-shaped pregroove formed in the submount to facilitate the placement of the fiber relative to the optical source. Although the package output 36 and package input 40 provide some support for the fibers 38 and 42 extending from the package 32, this support is insufficient to prevent the board-level fiber management problems described above and the resulting increased likelihood of damage to the internal fiber connections. The pig-tailed module 30 avoids the connector and mating losses and other instabilities associated with the connectorized module 10, but substantially increases the costs and risks associated with board-level assembly.

It is therefore apparent that a need exists for improved techniques for packaging optical modules, such that internal fiber connections can be utilized without the increased manufacturing cost, decreased reliability and other problems associated with conventional connectorized or pig-tailed packages.

SUMMARY OF THE INVENTION

The present invention provides an improved connectorized optical module package which substantially reduces the likelihood of damage to internal fiber connections from board-level assembly or other external stresses. An exemplary module package in accordance with the invention includes at least one external connector arranged on a side of the package, and a submount within the package for supporting a component such as an optical source or an optical detector. An optical fiber is connected within the package from the submount to a connector interface of the external connector. The end of the fiber connected to the interface has a preformed connector attached thereto which engages a ferrule at the external connector interface. The other end of the fiber is attached to the submount for optimal coupling efficiency. The submount may be positioned within the package at a location remote from the external connector interface, such that the fiber undergoes a bend, which may be on the order of 90° or 180°, from its first end at the connector ferrule to its second end at the component submount. The fiber bend ensures that stresses applied to the external connector during board-level assembly will not damage the internal fiber connection, while the ferrule and preformed fiber connector ensure a relatively low-loss optical signal path in the connectorized package. Alternative embodiments of the invention may utilize other bend angles for the internal fiber, or even a straight 0° bend connection for the internal fiber.

The module package of the present invention is particularly well-suited for use with optical transmitters, receivers and transceivers, as well as passive optical devices such as gratings, grating filters, routers and splitters. An illustrative transceiver embodiment includes a package with a transmit connector and a receive connector. A transmit fiber is connected within the package from a ferrule in an interface of the transmit connector to a submount of an optical source. One end of the transmit fiber is attached to the source submount, while a preformed connector on the other end of the transmit fiber engages the ferrule of the transmit connector. A receive fiber is configured in a similar manner, connected within the package from a ferrule in an interface of the receive connector to a submount of an optical detector. One end of the receive fiber is connected to the detector submount, while a preformed connector on the other end of the receive fiber engages the ferrule of the receive connector. Each of the receive and transmit fibers may undergo a bend from its preformed connector at one end to its submount connection at the other end. Exemplary embodiments may utilize fiber bends of 90° or 180°, depending on the relative positions of the external connectors and submounts. Alternative embodiments of the invention may utilize a single internal fiber connection for either the transmit or receive portion of the transceiver, or a single dual-fiber connector for interfacing with both transmit and receive fibers.

The module package of the present invention ensures that fiber connections used for internal transmit and receive fibers will not be stressed by forces external to the package during higher-level assembly processes. The internal fiber connections can be optimized such that maximum optical coupling is provided. Moreover, the package permits a low-loss connection between transmit and receive fibers and the corresponding ferrules of the respective transmit and receive connectors. As a result, the package may be connectorized without incurring the usual reflection and instability problems associated with conventional connectorized packages. The invention thus allows the use of internal fiber connections in connectorized packages, whereas conventional connectorized packages have generally been unable to utilize such connections. The improved connectorized package considerably reduces the likelihood of catastrophic damage to the module, and allows cost-effective automated assembly techniques to be used to install the module into a higher level circuit board. These and other features and advantages of the present invention will become more apparent from the accompanying drawings and the following detailed description.

BRIEF DESCRIPTION OF THE DRAWINGS

FIGS. 3A and 3B illustrate an exemplary embodiment of an opto-electronic module packaged in accordance with the present invention.

FIGS. 4 and 5 show other exemplary embodiments of an opto-electronic module packaged in accordance with the present invention.

DETAILED DESCRIPTION OF THE INVENTION

Figure 1:
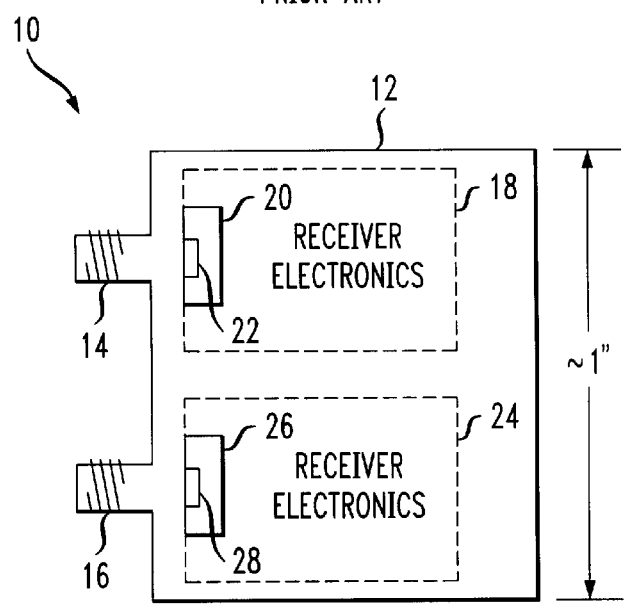
FIG. 1 shows a conventional connectorized optical transceiver module.
Figure 2:
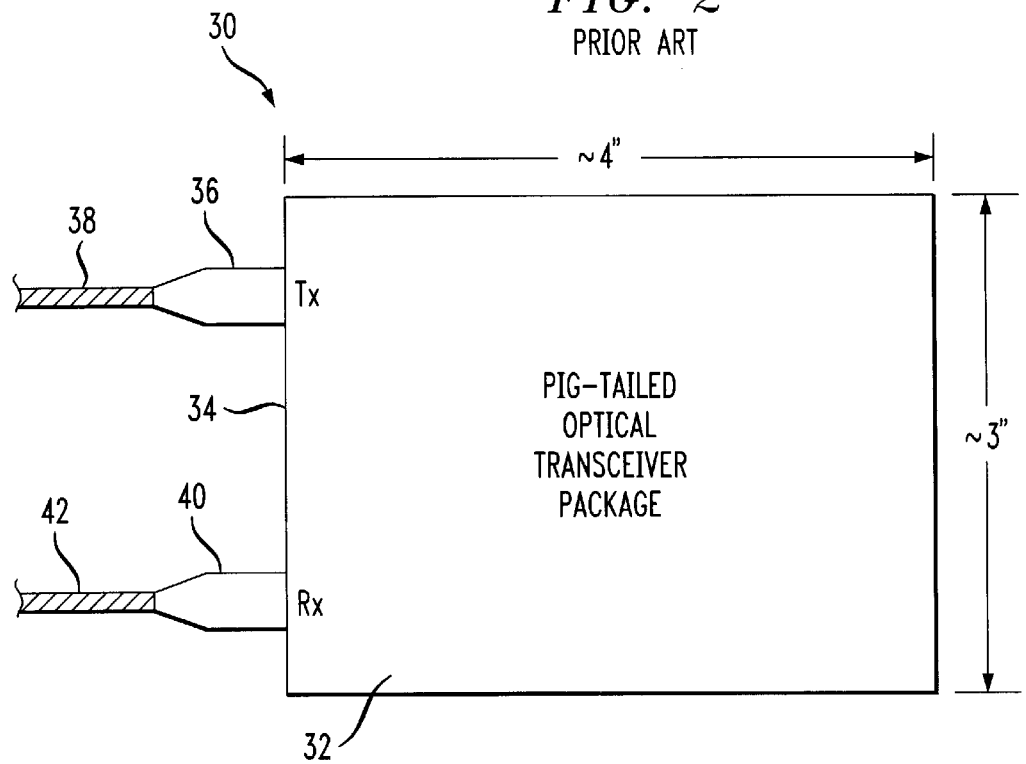
FIG. 2 shows a conventional pig-tailed optical transceiver module using fiber connections within the module.

The present invention will be illustrated below in conjunction with exemplary packages for optical transceiver modules. It should be understood, however, that the invention is not limited to use with any particular type of optical module, but is instead more generally applicable to any device in which it is desirable to simplify an interconnection between an optical fiber and a device component such as a transmitter laser or a receiver detector. For example, the invention is suitable for use with individually-packaged optical receivers and transmitters, as well as numerous other types of devices. The term "opto-electronic module" as used herein is therefore intended to include any device having an interface between an optical signal path and an electrical signal path, including electro-optic devices such as modulators and switches. Although particularly well-suited for use with opto-electronic modules, the techniques of the present invention may also be utilized to package passive optical devices such as gratings, grating filters, routers and splitters. The term "optical module" as used herein is intended to include these and other passive optical modules as well as opto-electronic modules. The term "component" as used herein is thus intended to include not only active devices such as lasers and detectors, but also passive optical devices. The term "submount" as used herein is intended to include a substrate, circuit board, heat sink or any other device used to support an optical source, optical detector or other opto-electronic module component within a module package. It should be noted that an internal surface of the package may serve as a submount in a given embodiment.

FIG. 3A shows an exemplary embodiment of an improved opto-electronic module 50 in accordance with the present invention. The module includes a connectorized package 52 with an output or transmit connector 54 and an input or receive connector 56, both arranged on a side 58 of the package 50. The transmit and receive optical connectors 54, 56 allow the module 50 to be connected to mating connectors of optical fibers on a circuit board on which the module 50 is to be installed. The portions of the connectors 54, 56 external to the package 52 are illustrated as connectors of the type known as FC or SC connectors, although numerous other types of connector configurations, including straight tip (ST) connectors and duplex connectors, could also be used. The external configuration selected for the connectors 54, 56 in a given application will generally depend on factors such as the type of connection required for the circuit board on which the module is to be installed.

The exemplary transceiver module 50 includes an internal fiber connection for only the transmitter portion of the module, which as previously noted is typically more likely to require the optimal coupling efficiency characteristic of a pig-tail connection. A transmit optical fiber 60 is arranged within the package 52 so as to prevent external stresses from board-level assembly from damaging the internal fiber connection. A first end 62 of the optical fiber 60 is attached to a submount 64, in proximity to an optical source 66 which is also attached to the submount 64, such that optical coupling between the source 66 and the fiber 60 is maximized. The optical source 66 may be a laser diode, a Fabry-Perot laser or other suitable optical signal source. The connection of the first end 62 of the fiber 60 to the submount 64 may be implemented using conventional pig-tailed fiber connection techniques. For example, the submount 64 may include a block having V-shaped pregroove which is used to facilitate the connection of the fiber 60 to the submount 64. During module-level assembly, the optical source 66 may be turned on at a low power level. The block having the V-shaped pregroove, with the fiber end 62 attached thereto, is then moved to different positions while the coupled optical power is monitored at external transmit connector 54. The block is then epoxied, soldered or otherwise secured in the particular position which corresponds to the optimal coupling from the source 66 to the fiber 60.

A second end 68 of the fiber 60 has a preformed connector attached thereto for securing the end 68 within a ferrule 70 adjacent to an internal interface 72 of the connector 54. The arrangement of the fiber 60 within the package 52 is such that the fiber 60 undergoes a gradual bend of approximately 180° from the end 68 secured in the ferrule 70 of connector 54 to the end 62 attached via a connection to the submount 64. This is in contrast to internal fiber connections in a conventional pig-tailed module. The conventional pig-tailed modules typically utilize an arrangement in which the submount 64 is arranged in close proximity to the transmit connector 54, with a relatively straight fiber connection from the submount extending out of the package. The internal fiber in a conventional pig-tailed module therefore generally does not undergo a deliberate gradual bend as shown in module 50 of FIG. 3A. Moreover, as previously noted, conventional connectorized module packages generally avoid the use of internal fiber connections altogether. The deliberate fiber bend used in the module package of FIG. 3A allows a low-loss connection between the fiber 60 and the ferrule 70 of connector 54, as well as a fiber connection to the submount 64 which is substantially less susceptible to damage from external stresses during board-level assembly. The illustrative 180° fiber bend shown in FIG. 3A is facilitated by the placement of the optical source submount 64 in a location within package 52 which is remote from the corresponding transmit connector 54. As previously noted, conventional module packages generally attempt to locate the optical source submount 64 as close as possible to the transmit connector. The present invention utilizes a heretofore unknown approach which has the effect of permitting the use of an internal fiber connection in a low-loss connectorized package. The package arrangement of FIG. 3A ensures that the fiber connection at end 62 will not be stressed by forces external to the package 52 during higher-level assembly processes.

Alternative embodiments of the transceiver module 50 of FIG. 3A may utilize different amounts of bending in connecting the fiber 60 from the connector ferrule 70 to the source submount 64. For example, the source submount could be rotated counter-clockwise by about 90° and placed in the lower right hand corner of the package 52, such that the fiber 60 undergoes a gradual bend of approximately 90° from end 68 to end 62. Numerous other alternative arrangements are also possible. Generally, the amount of bend will depend on the relative layout of the connectors and the component submounts. Depending on these layouts, it may be appropriate to use a straight or 0° fiber bend between the connector and the corresponding submount. Bends of more than 360° could also be used, with the fiber arranged in a spool of one or more revolutions, although such an arrangement would have the undesirable effect of increasing optical signal loss within the package.

As noted above, only the transmitter portion of the illustrative transceiver module 50 of FIG. 3A utilizes an internal fiber connection. A transmit optical signal generated by the optical source 66 may be modulated by a digital data stream or other modulation signal supplied by transmitter electronics 78, and the optical signal passes through fiber 60 and connector 54 to an external fiber associated with the circuit board on which the module 50 is installed. The above-described use of an internal fiber connection in a connectorized package provides optimal signal coupling from source 66 while eliminating the problems associated with board-level assembly stresses. In many applications it may be unnecessary to utilize a corresponding internal fiber connection for the receiver portion of a transceiver due to the positioning and size of the receiver detector. The receiver portion of the illustrative transceiver module 50 is thus configured in a conventional manner, with an optical detector 80 arranged adjacent to an internal connector interface 81 of the receiver connector 56. The detector 80 may be a positive-intrinsic-negative (PIN) photodiode, an avalanche photodiode (APD) or other suitable detector. An input optical signal applied to the connector 56 is detected in detector 80, and the detected electrical signal is supplied to receiver electronics 82 for further processing.

FIG. 3B shows a side-sectional view of the transceiver module 50, taken along the section line B–B' of FIG. 3A. The connectors 54, 56 include respective central openings 84 and 86 which serve as optical waveguides for delivering optical signals to or from external fibers connected to the module 50. It can also be seen from FIG. 3B that a number of electrical pins 88 extend from a lower surface 89 of the module 50. The electrical pins 88 serve to provide connections between the transmitter and receiver electronics 78, 82 and a circuit board on which the module 50 is installed. This type of package configuration with electrical pins 88 extending from the module 50 is often referred to as a "through-hole" configuration.

FIG. 4 shows another illustrative embodiment of a transceiver module 50' with an improved package in accordance with the present invention. In this embodiment, internal fiber connections are used for both transmitter and receiver portions of the transceiver module. The transmitter portion includes fiber 60 arranged in the manner described in conjunction with FIG. 3A with a 180° bend between end 62 connected to source submount 64 and end 68 secured within connector ferrule 70. A receive optical fiber 90 is used to provide an internal fiber connection for the receiver portion of the module 50'. Like the transmit optical fiber 60, the receive optical fiber 90 is arranged within the package 52' so as to prevent external stresses from board-level assembly from damaging the internal receive fiber connection. The internal connection is used to attach a first end 92 of the optical fiber 90 to a detector submount 94, in proximity to an optical detector 96 which is also attached to the submount 94, such that optical coupling between the fiber 90 and the detector 96 is maximized. As in the FIG. 3A embodiment, the optical detector 96 may be a PIN diode detector or an APD detector. The detector submount 94 may include a block with a V-shaped pregroove for facilitating the connection of the fiber 90 to the submount 94 in the manner previously described in conjunction with source submount 64. A low-power testing process similar to that described above may be used to align the block containing the receive fiber pregroove. The fiber end 92 is epoxied, soldered or otherwise secured in the pregroove, and the block is subsequently secured in the position determined to correspond to optimal coupling from the fiber 90 to the detector 96.

A second end 98 of the fiber 90 has a preformed connector attached thereto for securing the end 98 within a ferrule 100 adjacent to an internal interface 102 of the receive connector 56'. Like the arrangement of transmit fiber 60, the arrangement of the receive fiber 90 within the package 52' is such that the fiber 90 undergoes a gradual bend of approximately 180° from the end 98 secured in the ferrule 100 of connector 56' to the end 92 attached via an internal fiber connection to the detector submount 94. This deliberate fiber bend allows a low-loss connection between the fiber 90 and the ferrule 100 of connector 56', and also provides an internal fiber connection to the submount 94 which is substantially less susceptible to damage from external stresses during board-level assembly. The illustrative 180° receive fiber bend shown in FIG. 4 is facilitated by the placement of the detector submount 94 in a location within package 52' which is remote from the corresponding receive connector 56'. The package arrangement of FIG. 4 ensures that the internal fiber connections used for both transmit fiber 60 and receive fiber 90 will not be stressed by forces external to the package 52 during higher-level assembly processes. Moreover, the arrangement permits a low-loss connection between the transmit and receive fibers and the corresponding ferrules of the respective transmit and receive connectors. As a result, the package may be connectorized as shown in FIG. 4, without incurring the usual reflection and instability problems associated with conventional connectorized packages. It should be noted that the receive fiber 90 of FIG. 4 may also be arranged with the alternative fiber bends described in conjunction with transmit fiber 60 above. The particular amount of fiber bend selected in a given application will generally depend on factors such as the relative size and position of the internal components, such as the optical source, optical detector, source and detector submounts, and transmitter and receiver electronics.

Figure 5:
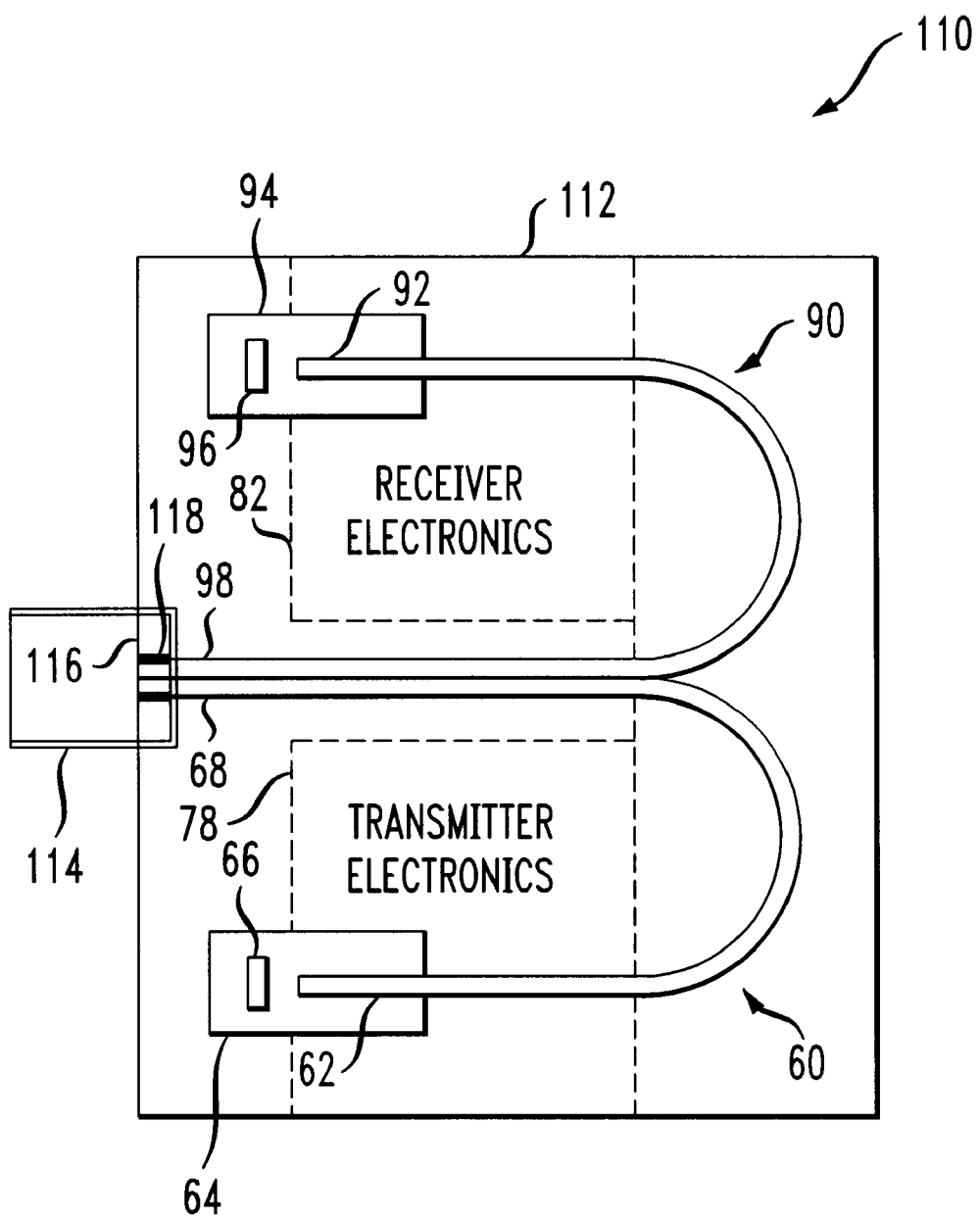

FIG. 5 shows another illustrative transceiver module 110 with an improved package in accordance with the present invention. The module 110 includes a package 112 having a dual-fiber connector 114 extending from one of its sides as shown. Like the FIG. 4 embodiment, the FIG. 5 embodiment utilizes internal fiber connections for both transmitter and receiver portions of the transceiver module 110. The transmitter portion includes transmit fiber 60 arranged with an approximately 180° bend between ends 62 and 68, while the receiver portion includes receive fiber 90 arranged with an approximately 180° bend between ends 92 and 98. The ends 62 and 92 are connected to the respective submounts 64 and 94 in the manner previously described. The opposite ends 68 and 98 are both secured adjacent to an internal interface 116 in a ferrule 118 of the dual-fiber connector 114. The fiber ends 68 and 98 may, but need not, include pre-formed connectors attached thereto for facilitating connection with the ferrule 118. The receive and transmit optical fibers 60 and 90 are thus arranged within the package 112 so as to prevent external stresses from board-level assembly from damaging the internal transmit and receive fiber connections, respectively. As in the previous embodiments, the fibers 60 and 90 of the FIG. 5 embodiment may also be configured to utilize any of a number of different types of bends, depending upon the relative placements of the submounts 64, 94 and the dual-fiber connector 114.

The illustrative packages of FIGS. 3A, 4 and 5, unlike conventional opto-electronic device packages, completely isolate the external fiber management problem from the opto-electronic circuit board assembly operation. As a result, the fiber connections within the module package are substantially less susceptible to damage than in a conventional connectorized or pig-tailed module package. The module package of the present invention utilizes an internal fiber connection which can be optimized for maximum coupling efficiency, with a low-loss external connector. A user assembling the module into an opto-electronic circuit board will have little or no difficulty attaching circuit board fibers or other connectors to the inventive package. Its assembly into an opto-electronic circuit board can proceed using conventional automated assembly techniques, without the need for delicate handling of the fibers. There is no significant danger that the board-level assembly process will result in internal fiber damage which may render the transceiver unusable. The present invention thus facilitates the circuit board assembly process, reducing the cost of the manufactured opto-electronic product while also increasing its reliability. As noted above, the optical module packages of the present invention, although particularly well-suited for use with opto-electronic modules, may also be used to package passive optical devices such as gratings, grating filters, routers and splitters.

The above-described embodiments of the invention are intended to be illustrative only. Numerous alternative embodiments may be devised by those skilled in the art without departing from the scope of the following claims.

What is claimed is:

1. An optical module comprising:
   a package;
   an external optical connector arranged on a side of the package;
   a submount within the package for supporting a non-fiber based component; and
   an optical fiber arranged within the package and having a first end coupled to an interface of the external optical connector and a second end coupled to the submount supporting the non-fiber based component.

2. The module of claim 1 wherein the optical fiber is arranged such that the fiber undergoes a bend from the first end to the second end.

3. The module of claim 1 wherein the optical module is a passive optical module.

4. The module of claim 1 wherein the optical module is an opto-electronic module.

5. The module of claim 1 wherein the optical module is an optical transmitter and the component attached to the submount is an optical source.

6. The module of claim 1 wherein the first end of the fiber has a preformed connector attached thereto, the preformed connector engaging a ferrule in the external connector interface.

7. The module of claim 1 wherein the second end of the fiber is attached via an optical fiber connection to the submount adjacent to the component.

8. The module of claim 1 wherein the external connector is a dual-fiber connector, securing the first end of the optical fiber as well as an end of an additional optical fiber.

9. The module of claim 2 wherein the fiber undergoes a bend of about 90° from the first end to the second end.

10. The module of claim 2 wherein the fiber undergoes a bend of about 180° from the first end to the second end.

11. The module of claim 1 wherein the submount is located in a portion of the package remote from the external connector.

12. The module of claim 1 further including:
a second external optical connector arranged on the same side of the package as the first external connector;
a second submount within the package for supporting a second non-fiber based component; and
a second internal fiber arranged within the package and having a first end coupled to an interface of the second external optical connector and a second end coupled to the second submount, such that the second fiber undergoes a bend from the first end to the second end.

13. The module of claim 12 wherein the module is an optical transceiver, the first component attached to the first submount is an optical source, and the second component attached to the second submount is an optical detector.

14. The module of claim 12 wherein the second fiber undergoes a bend of about 90° from the first end to the second end.

15. The module of claim 12 wherein the second fiber undergoes a bend of about 180° from the first end to the second end.

16. The module of claim 12 wherein the second submount is located in a portion of the package remote from the second external connector.

17. A method of packaging an optical module, comprising the steps of:
connecting a first end of an optical fiber within a package such that the first end is coupled to an interface of an external optical connector arranged on a side of the package; and
connecting a second end of the fiber to a submount arranged within the package for supporting a non-fiber based component.

18. The method of claim 17 wherein the steps of connecting the first and second ends of the fiber include connecting the first and second ends such that the fiber undergoes a bend from the first end to the second end.

19. The method of claim 17 wherein the step of connecting the first end of the fiber includes bringing a preformed connector attached to the first end into engagement with a ferrule in the external connector interface.

20. The method of claim 17 wherein the step of connecting the second end of the fiber includes attaching the second end to the submount via an optical fiber connection adjacent to the component.

21. The method of claim 17 wherein the step of connecting the first end of the optical fiber includes connecting the first end such that the first end is coupled to an interface of a dual-fiber connector, wherein the dual-fiber connector is also used to secure an end of an additional optical fiber.

22. The method of claim 18 wherein the connecting steps include connecting the fiber such that the fiber undergoes a bend of about 90° from the first end to the second end.

23. The method of claim 18 wherein the connecting steps include connecting the fiber such that the fiber undergoes a bend of about 180° from the first end to the second end.

24. The method of claim 17 wherein the submount is located in a portion of the package remote from the external connector.

25. The method of claim 17 further including the steps of:
connecting a first end of a second optical fiber within the package such that the first end of the second fiber is coupled to an interface of a second external optical connector arranged on the side of the package; and
connecting a second end of the second fiber to a second submount arranged within the package for supporting a second non-fiber based component, such that the second fiber undergoes a bend from its first end to its second end.

26. The method of claim 25 wherein the step of connecting the first end of the second fiber includes bringing a preformed connector attached to the first end into engagement with a ferrule in the interface of the second external connector.

27. The method of claim 25 wherein the step of connecting the second end of the second fiber includes attaching the second end to the second submount via an optical fiber connection adjacent to the second component.

28. The method of claim 25 wherein the second submount is located in a portion of the package remote from the second external connector.

29. An optical module comprising:
a package;
first and second external optical connectors arranged on at least one side of the package;
first and second submounts within the package for supporting respective first and second non-fiber based components;
a first optical fiber arranged within the package and having a first end coupled to an interface of the first external optical connector and a second end coupled to the first submount; and
a second optical fiber arranged within the package and having a first end coupled to an interface of the second external optical connector and a second end coupled to the second submount.

30. The module of claim 29 wherein at least one of the first and second optical fibers is arranged such that the at least one fiber undergoes a bend from its first end to its second end.

31. The module of claim 29 wherein the optical module is a passive optical module.

32. The module of claim 29 wherein the optical module is an opto-electronic module.

33. The module of claim 29 wherein the optical module is an optical transceiver, the first component is an optical source and the second component is an optical detector.

34. The module of claim 29 wherein the first ends of the first and second fibers each have a preformed connector attached thereto, the preformed connector engaging a ferrule in the corresponding external connector interface.

35. The module of claim 29 wherein the second ends of the first and second fiber are attached to the respective first and second submounts via optical fiber connections adjacent to the respective first and second components.

36. The module of claim 30 wherein at least one of the first and second fibers undergoes a bend of about 90° from its first end to its second end.

37. The module of claim 30 wherein at least one of the first and second fibers undergoes a bend of about 180° from its first end to its second end.

38. The module of claim 29 wherein at least one of the first and second submounts is located in a portion of the package remote from its corresponding external connector.

39. An optical module comprising:

a package;

an external dual-fiber optical connector arranged on a side of the package;

first and second submounts within the package for supporting respective first and second non-fiber based components;

a first optical fiber arranged within the package and having a first end coupled to an interface of the external optical connector and a second end coupled to the first submount; and a second optical fiber arranged within the package and having a first end coupled to the interface of the external optical connector and a second end coupled to the second submount.

40. The module of claim 39 wherein at least one of the first and second optical fibers is arranged such that the at least one fiber undergoes a bend from its first end to its second end.

* * * * *